(12) United States Patent
Heuer

(10) Patent No.: US 6,236,660 B1
(45) Date of Patent: May 22, 2001

(54) METHOD FOR TRANSMITTING DATA PACKETS AND NETWORK ELEMENT FOR CARRYING OUT THE METHOD

(75) Inventor: Volkmar Heuer, Ditzingen (DE)

(73) Assignee: Alcatel, Paris (FR)

(*) Notice: Subject to any disclaimer, the term of this patent is extended or adjusted under 35 U.S.C. 154(b) by 0 days.

(21) Appl. No.: 09/150,150

(22) Filed: Sep. 9, 1998

(30) Foreign Application Priority Data

Sep. 12, 1997 (DE) ............................................. 197 40 107

(51) Int. Cl.⁷ .................................................. H04Q 11/04
(52) U.S. Cl. ........................ 370/409; 370/391; 370/392; 370/397; 370/399
(58) Field of Search .................................. 370/254, 347, 370/351, 389, 395, 396, 397, 398, 399, 400, 401

(56) References Cited

U.S. PATENT DOCUMENTS

| 5,103,447 | 4/1992 | Takiyasu et al. | 370/85.15 |
| 5,241,543 | 8/1993 | Amada et al. | 370/100.1 |
| 5,247,518 | 9/1993 | Takiyasu et al. | 370/85.15 |
| 5,251,239 | 10/1993 | Turban et al. | 370/365 |
| 5,267,239 | 11/1993 | Pospischil et al. | 370/112 |
| 5,311,506 | 5/1994 | Biesel | 370/378 |
| 5,323,389 | 6/1994 | Bitz et al. | 370/60.1 |
| 5,357,504 | 10/1994 | Siegmund | 370/469 |

(List continued on next page.)

FOREIGN PATENT DOCUMENTS

| 32 10 462 | 9/1983 | (DE) | H04L/11/20 |
| 3210462 | 9/1983 | (DE) | H04L/11/20 |
| 43 04 916A1 | 2/1993 | (DE) | H04L/12/56 |
| 4304916 | 8/1994 | (DE) | H04L/12/56 |
| 195 05 905 | 10/1995 | (DE) | H04B/7/15 |
| 195 31 611 | 11/1996 | (DE) | H04L/5/22 |
| 0 415 112 | 3/1991 | (EP) | H04J/3/16 |
| 2278979 | 12/1994 | (GB) | H04J/3/16 |
| WO 96-10876 | 4/1996 | (WO) | H04L/5/22 |

OTHER PUBLICATIONS

J. Cornu et al, "Synchronous Networks" in: *Electrical Communication* [ISSN 0013–42521], published by Alcatel NV, Paris, France, vol. 65, No. 1 (Oct. 1991), pp. 27–31.

G. Parr & S. Wright, "A Proposed Protocol Improvement for ATM Cell Processing Within SDH Multiplexers," in ConneXions, vol. 10, # 11, Nov. 1996, pp. 14–24.

Ipsilon Networks, "The Intelligence of Routing, the Performance of Switching,"Ipsilon Technical White Paper on IP Switching (Sunnyvale CA, Feb. 1996, last revised Jul. 10, 1996), 8 pages.

W. Simpson, "Request for Comments (RFC) 1619," Internet Engineering Task Force, Network Working Group, pages i, ii, 1–3 (May 1994).

*Primary Examiner*—Douglas Olms
*Assistant Examiner*—Shick Hom
(74) *Attorney, Agent, or Firm*—Milton Oliver; Ware, Fressola, Van Der Sluys & Adolphson LLP

(57) ABSTRACT

A method is disclosed for transmitting data packets in wide area networks (WAN) by way of a synchronous digital data transmission network (SDH), wherein the data packets are packed into synchronous transport modules (STM-N) and are transmitted by way of virtual connections formed by subunits of synchronous transport modules of the same size. The virtual connections are entered into an address table and an evaluation of the target address of the data packets takes place in one of the network elements of the synchronous digital data transmission network. On the basis of the address table and the target address, at least for a part of the data packets, a decision is made by at least one of the network elements of the synchronous digital data transmission network as to which one of the virtual connections is used to transmit this data packet. Furthermore, a network element is disclosed, which operates in accordance with the transmission method.

12 Claims, 7 Drawing Sheets

U.S. PATENT DOCUMENTS

| | | | |
|---|---|---|---|
| 5,430,729 | 7/1995 | Rahnema | 270/94.1 |
| 5,479,401 | 12/1995 | Bitz et al. | 370/60.1 |
| 5,689,512 | 11/1997 | Bitz et al. | 370/395 |
| 5,845,091 * | 12/1998 | Dunne et al. | 370/400 |
| 5,864,536 | 1/1999 | Foglar | 370/232 |
| 5,903,559 * | 5/1999 | Acharya et al. | 370/347 |
| 5,951,649 * | 9/1999 | Dobbins et al. | 370/351 |
| 5,963,555 * | 10/1999 | Takase et al. | 370/395 |

* cited by examiner

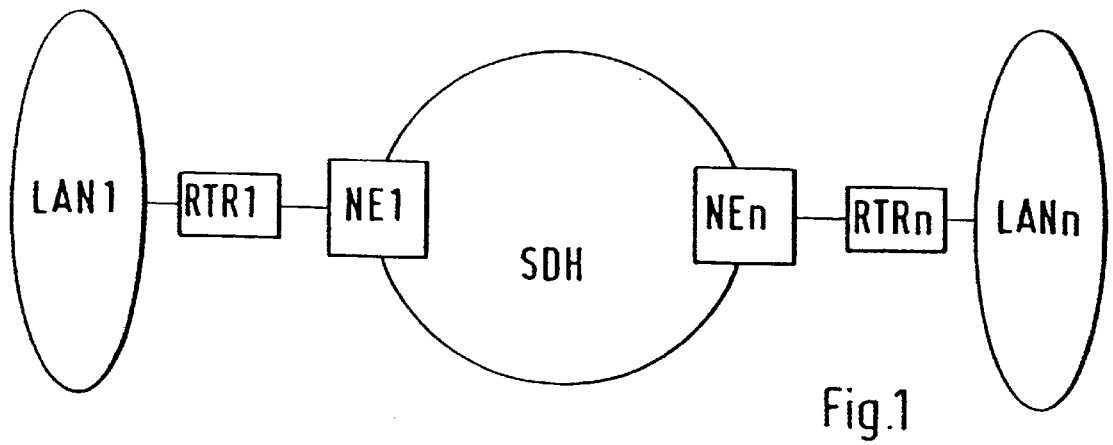
Fig.1 PRIOR ART
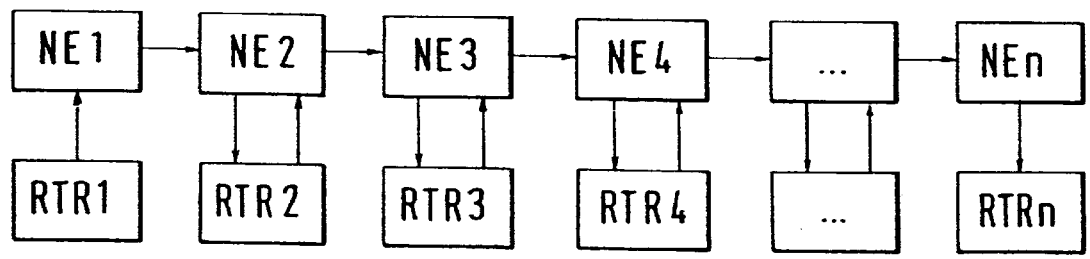
PRIOR ART Fig.2
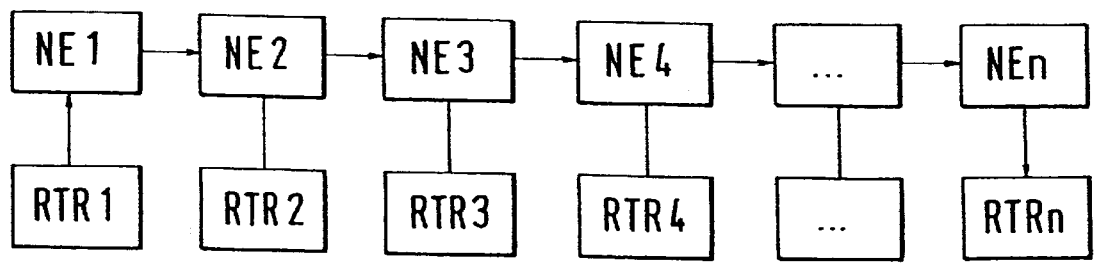
Fig.3

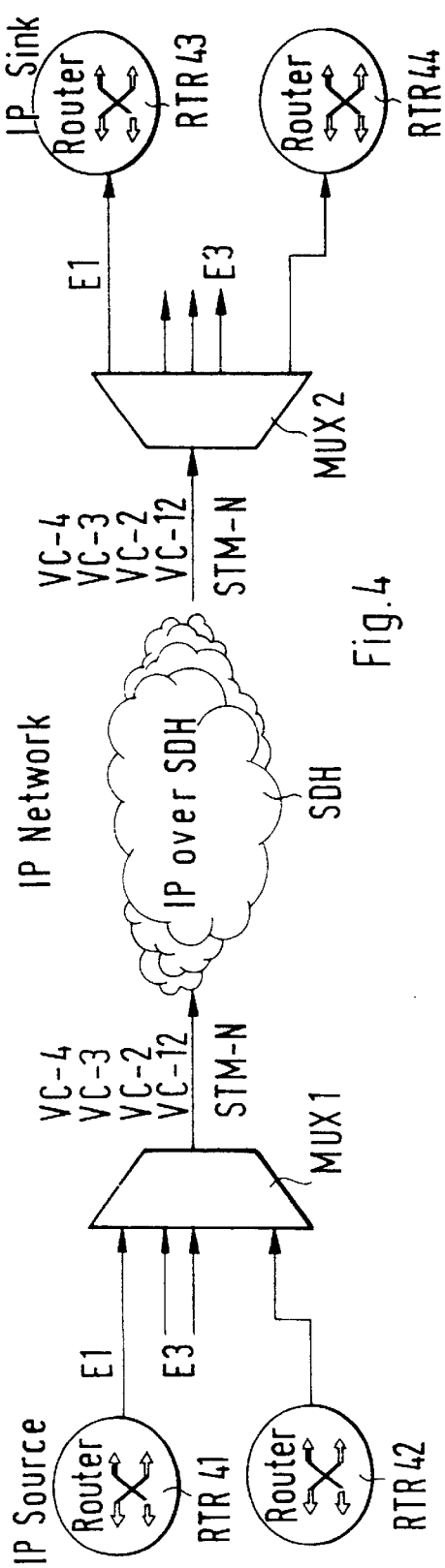
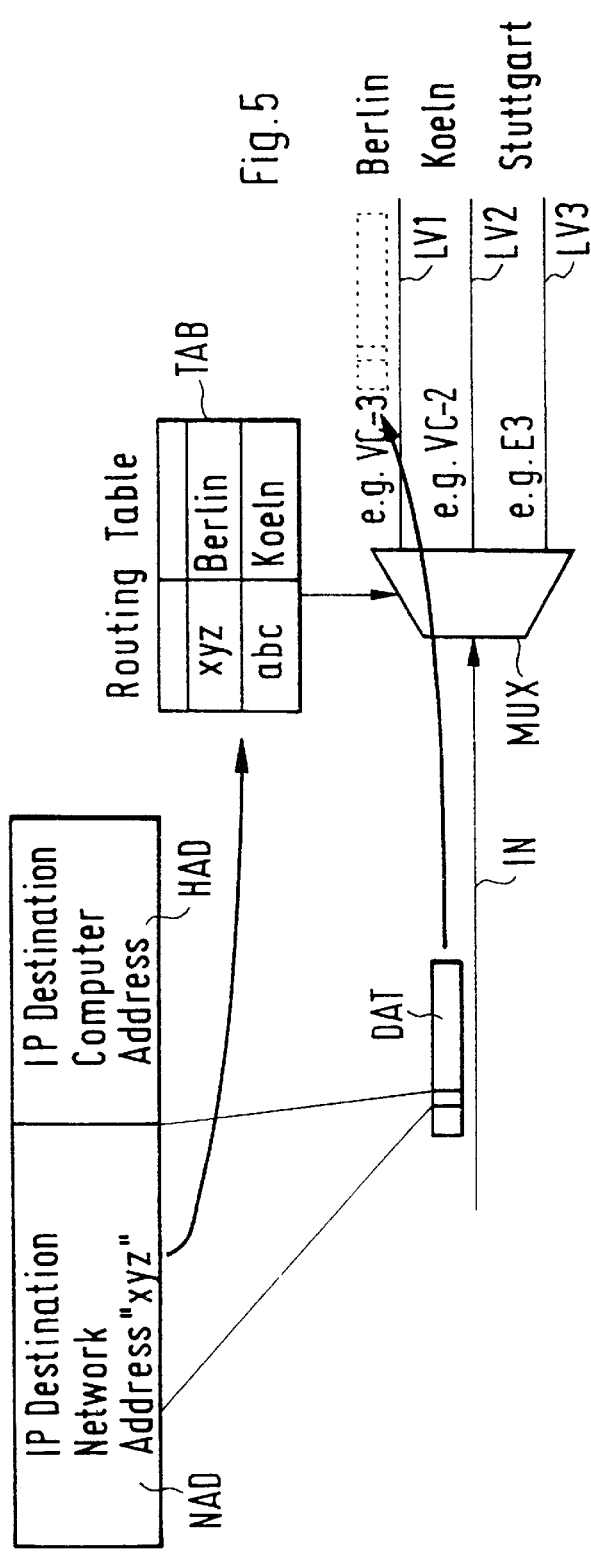

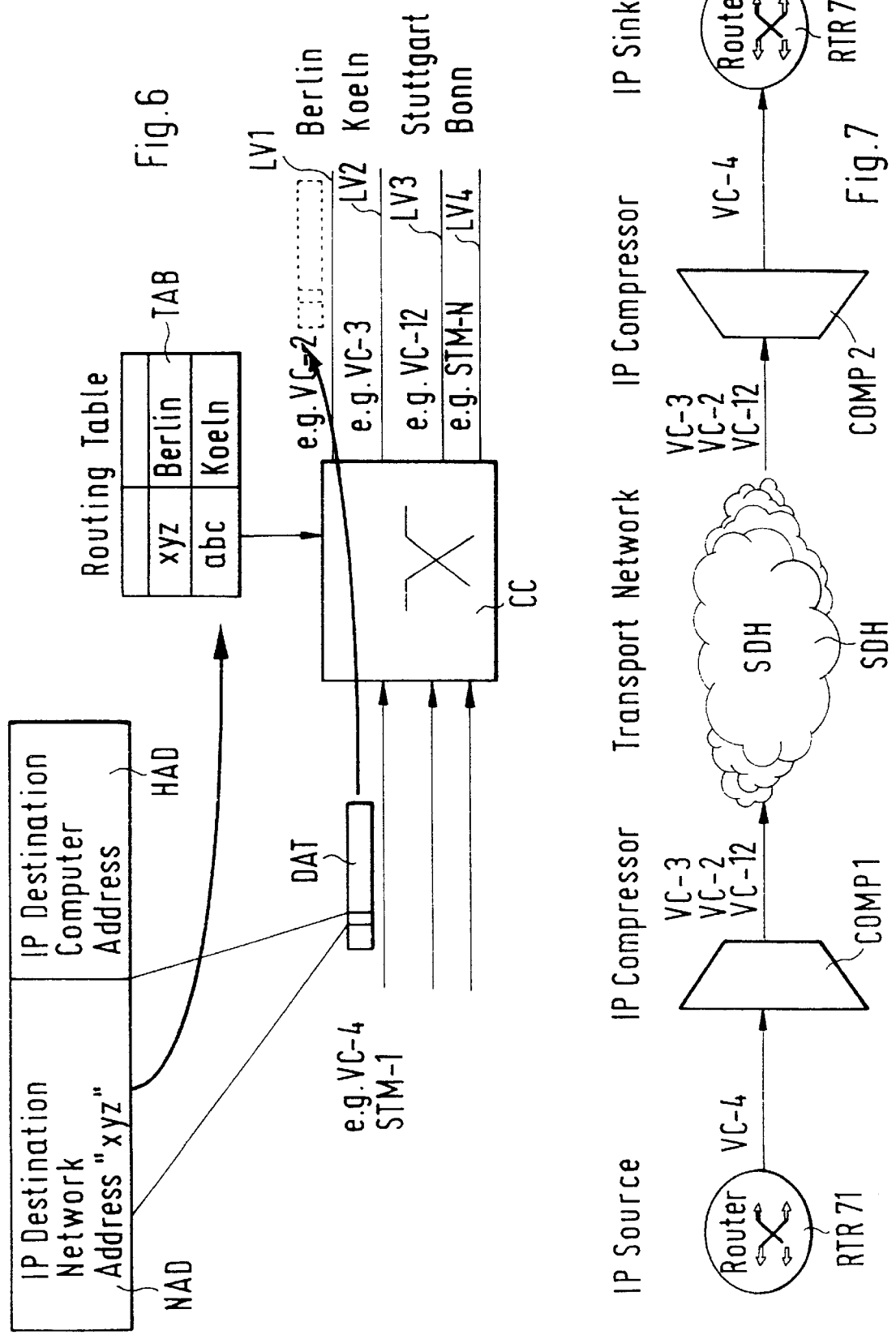

METHOD FOR TRANSMITTING DATA PACKETS AND NETWORK ELEMENT FOR CARRYING OUT THE METHOD

TECHNICAL FIELD

The invention relates to a method for transmitting data packets via a synchronous digital data transmission network in which the data packets are packed into synchronous transport modules. It is also directed to a network element for such a synchronous digital data transmission system.

BACKGROUND OF THE INVENTION

Wide area networks, so called WANs, are used as a transmission medium for connecting local area networks, so called LANs. An article by G. Parr et al. ("A Proposed Protocol Improvement for ATM Cell Processing within SDH Multiplexers", ConneXions Vol. 10, No. 11, November 1996, pp. 14–24) describes the fact that the data packets are first transmitted to an interworking unit, which has a routing table for its local nodes. Outgoing data packets whose addresses are not contained in the routing table are converted by an ATM access unit into ATM cells (ATM: asynchronous transport mode) and are conveyed by an ATM switch into suitable virtual channels within virtual paths of the ATM-WANs. From there, the ATM cells travel to a synchronous multiplexer, which operates in accordance with the SDH or SONET recommendations and standards of the ITU and ANSI, and are packed into virtual containers and synchronous transport modules for transmission. So that all of the data packets do not have to be unpacked again at each SDH node, data bytes are written into the path overhead of the virtual containers, which indicate whether a virtual container must be unpacked again in the next SDH node. Disadvantages of this method are that a number of costly devices are required for the ATM network and that the transmission times are relatively long.

Today, data packets are mostly structured in accordance with the internet protocol (IP) and have a source IP address and a target IP address. In an article from the Ipsilon Networks Co. ("IP Switching: The Intelligence of Routing, the Performance of Switching", Ipsilon Technical White Paper on IP Switching, February 1996, which can be accessed on the internet at http://www.ipsilon.com/productinfo/wp-ipswitch.html), a device (IP switch) is disclosed, which combines the function of an IP router and an ATM switch. It is in a position to identify longer sequences of data packets with the same source and target address, so-called flows and to establish device-internal connections suitable for them. As a result, the throughput of data packets through the IP switch increases and the average switching time is reduced. The costs for a transmission system with this kind of IP switches are relatively high.

In RFC1619 (W. Simpson, Request for Comments 1619, Internet Engineering Task Force, Network Working Group, May 1994), for point-to-point connections, the proposal is made to pack data packets by means of a frame structure, which is called a synchronous payload envelope (SPE), directly into synchronous transport modules (STM-N) from SDH or synchronous transport signals (STS-N) from SONET. However, this has the disadvantage that all of the transport modules must be unpacked in each network node of the synchronous data transmission network, which on the one hand, puts a strain on the network nodes and can lead to stoppages, and on the other hand, increases the transmission times.

SUMMARY OF THE INVENTION

The object of the invention is to disclose a method for transmitting data packets, which is inexpensive to realize and permits shorter transit times. A further object of the invention is to disclose a network element of a synchronous digital data transmission system that is suitable for this method.

The object is attained by a method for transmitting data packets by way of a synchronous digital data transmission network in which the data packets are packed into synchronous transport modules, wherein the subunits of synchronous transport modules of the same size are used in order to establish logical virtual connections between network elements of the synchronous digital data transmission network, that the virtual connections are entered into an address table, that in at least one part of the network elements of the synchronous digital data transmission network, an evaluation of the target address of the data packets takes place and that at least for a part of the data packets from at least one of the network elements of the synchronous digital data transmission network, on the basis of the address table and the target address, a decision is made as to which one of the virtual connections is used to transmit this data packet.

This object is also attained by a network element for a synchronous digital data transmission system, characterized by means of an interface by way of which the network element receives data packets with a target address, a memory in which an address table is stored, which has entries regarding logical virtual connections between network elements of the synchronous digital data transmission network, means for evaluating the target address of data packets, means for making a decision on the basis of the target address and the address table as to which one of the virtual connections is used to transmit a data packet.

BRIEF DESCRIPTION OF THE DRAWINGS

An advantage of the invention is that it permits a hierarchical structure of wide area networks.

Exemplary embodiments of the invention will be described below in conjunction with FIGS. 1 to 12.

FIG. 1 shows two local area networks (LANs) connected by way of a synchronous digital data transmission network, FIG. 2 shows the transmission path of an individual data packet in the prior art, FIG. 3 shows the transmission path of an individual data packet according to the invention, FIG. 4 shows a synchronous digital transmission system with multiplexers at the transfer points, FIG. 5 shows a multiplexer that operates in accordance with the method according to the invention, FIG. 6 shows a cross-connect that operates in accordance with the method according to the invention, FIG. 7 shows a synchronous digital transmission system with compressors that operate according to the invention.

BEST MODE FOR CARRYING OUT THE INVENTION

Figure 8:
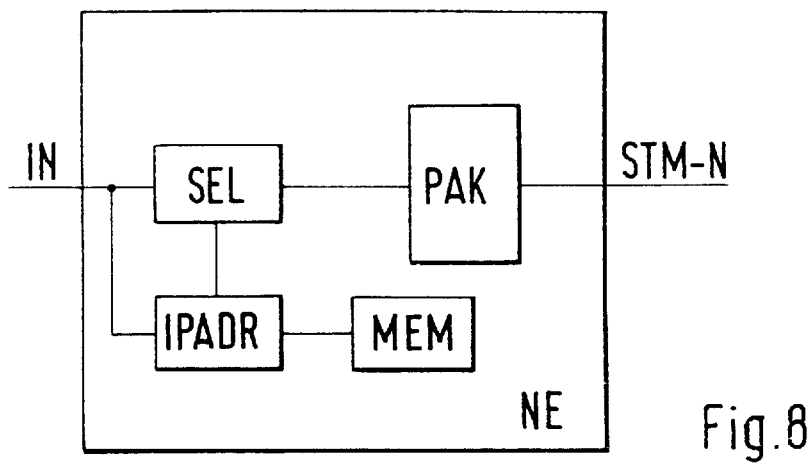
FIG. 8 shows a network element for a synchronous digital data transmission network.

One fundamental concept of the invention lies in establishing fixed virtual connections, i.e. logical connections in the synchronous digital data transmission system by using subunits of synchronous transport modules. In SDH systems, subunits of this kind are called virtual containers (VC) and in SONET systems, they are called virtual tributaries (VT). Another fundamental concept is comprised in packing the data packets, which are transmitted via a synchronous digital data transmission network, directly, i.e. without protocol conversion as in ATM, into the subunits of the synchronous transport modules so that the packed subunits can be transmitted from a data source to a data sink without an intermediary unpacking and repacking. The data packets can additionally be packed in a frame structure of another protocol, for example the HDLC protocol. In the network element, which packs a data packet into a virtual container, a third fundamental concept is to evaluate the target address of the data packet and to make a decision as to which one of the virtual connections is used to transmit the data packet. If necessary, the capacity of the virtual connections can be dynamically adapted to the loading.

A virtual connection is understood to mean a logical connection between two network elements. A logical connection of this kind is produced by virtue of the fact that two network elements periodically exchange subunits of synchronous transport modules, so-called virtual containers, and thereby the subunits are switched through in other network elements disposed between them without being repacked. Virtual connections are established by a central network management system of the synchronous digital data transmission network and have a fixed transmission capacity that depends on the type of virtual container, i.e. they are permanent virtual connections. The possible virtual connections have a transmission capacity of 2 Mbit/s when using VC-12 containers, 6 Mbit/s with VC-2, 48 Mbit/s with VC-3, and 149 Mbit/s with VC-4 containers.

FIG. 1 shows a digital synchronous data transmission network SDH. A first local area network LAN1 is connected via a first router RTR1 to a first network element NE1 of the synchronous data transmission network SDH. Another local area network LANn is connected by way of another router RTRn to another network element NEn of the synchronous data transmission network SDH. In the first local area network LAN1, if a data packet is sent, which is designated for a receiver of the other data network LANn, then the first router RTR1 gives the data packet to the first network element NE1. In the first network element NE1, the data packet is packed as a payload into a synchronous transport module and is transmitted via the synchronous data transmission network SDH until reaching the other network element NEn. There, the data packet is unpacked again and sent via the other router RTRn into the other local area network LANn.

Additional network elements can be connected between the first network element NE1 and the other network element NEn. This is shown in FIGS. 2 and 3. Each of the network elements NE1–NEn shown is connected to a router RTR1–RTRn, which connects a local area network, not shown, to the synchronous data transmission network.

In FIG. 2, a synchronous transmission system is shown, which is operated in accordance with the proposal by W. Simpson (Request for Comments 1619, Internet Engineering Task Force, Network Working Group, May 1994), which was described at the beginning. It contains n network elements CC1–CCn, which are connected into a chain. Each of these network elements has a connection that is connected to an IP router RTR1–RTRn, which connects a local area network, not shown, to the synchronous transmission system. The path of a data packet from the first router RTR1 to the nth router RTRn is represented by arrows. In the first network element CC1, the data packet is packed into a virtual container and sent to the second network element CC2. There, it is unpacked again and supplied to the second router RTR2, which checks the target address, determines that the data packet is not designated for its connected local area network, but must be forwarded, and sends it back to the second network element CC2 to be forwarded. This cycle repeats in the succeeding network elements until the data packet has reached the nth router.

A data transmission network that operates in accordance with such a method, in which the data packets, which are transmitted in the payload of synchronous transport modules, are unpacked in each network element and sent to the connected router, and in which for each data packet, the router then checks whether the packet is designated for its own local area network and sends the remaining data packets back to the connected network element to be forwarded, requires long transmission times and loads both the network elements and the IP router.

The synchronous data transmission system shown in FIG. 3 operates in accordance with the method according to the invention: as indicated by arrows, a data packet is transmitted from the first router RTR1 to the local area network connected to the nth router RTRn. The target address of the data packet is evaluated in the first network element. From an address table stored in the first network element NE1, the network element infers that the data packet must be sent to the nth network element NEn and therefore, on the basis of the target address and the address table, makes the decision that the data packet is packed into a virtual container of a synchronous transport module, which is designated for the nth network element. This virtual container is switched through in the intermediate n–2 network elements NE2–NE (n–1), without the data packet being unpacked. Between the first network element NE1 and the nth network element NEn, there is a virtual connection that is listed in the address table. The virtual container is switched through via this virtual connection.

A virtual, logical connection of this kind is established by a central network management system. It is advantageous if the virtual connections in the synchronous digital data transmission system are reestablished after predetermined time intervals, for example hourly, in order to adapt the network to the current use. In such a reconfiguration, in order to optimize the data flow, it is also possible to establish point-to-multipoint connections (so-called multicast connections) if this achieves an improved data transmission.

For particular target addresses or groups of target addresses, the address table contains an entry that states via which of the existing virtual connections the relevant data packet should be transmitted and where all of the remaining data packets with target addresses that are not entered should be transmitted. This address table is advantageously prepared and allocated for each of the network elements by the central management system. Another possibility is comprised in that a network element generates the address table itself by virtue of the fact that it records the target and source addresses of incoming data packets and from them, obtains information about which virtual connection should be used to reach a previously unknown target address. It is advantageous if a number of network elements their address tables at predetermined time intervals, for example via a service channel, so that detours and loops in the network are prevented.

The network elements NE1 and NEn can, for example, be a multiplexer and a demultiplexer. This is represented as a first exemplary embodiment in FIGS. 4 and 5. FIG. 4 shows an SDH system that operates according to the invention. A first multiplexer MUX1 has four inputs, two of which are connected, for example, to routers RTR41, RTR42 and local area networks connected to them. The routers RTR41, RTR42 transmit data packets from the local area networks respectively connected to them, which are designated for addressees that cannot be reached in the respective local area network, to the first multiplexer MUX1. The E1 and E3 interfaces of the plesiochronous digital hierarchy are used as interfaces between the routers RTR41, RTR42 (according to the recommendations of the CCITT/ITU-T).

In the synchronous digital data transmission network SDH, the multiplexer knows the virtual connections to other network elements in the network. It evaluates the target addresses of incoming data packets and on the basis of these target addresses and the stored address table, makes the decision as to which one of the virtual connections is used to transmit a data packet. In accordance with this decision, it packs a respective data packet into a virtual container that corresponds to the selected connection, e.g. VC-4, VC-3, VC-2, or VC12. By way of the virtual connections, the virtual containers in the synchronous digital data transmission network SDH are transmitted to a receiving network element, in the first exemplary embodiment, to a second multiplexer MUX2. This unpacks the data packets from the virtual containers contained in the received transport modules, evaluates the target address, and on the basis of its address table, decides by way of which of its outputs the respective data packet will be transmitted to a connected router RTR43, RTR44.

In the first exemplary embodiment, the data packets are ones that are structured in accordance with the widely used internet protocol IP. That is why the routers RTR41–RTR44 are called IP routers and the entire wide area network is called an IP network. However, there are also other protocols, e.g. the protocol IPX from the Novell Company.

The path of a data packet PAK in the first exemplary embodiment is shown in detail in FIG. 5. The data packet DAT arriving by way of the input IN of the multiplexer MUX has an address section, which contains a target address NAD and a source address HAD. In the example, the target address reads "xyz". The multiplexer evaluates the target address NAD, by virtue of the fact that it compares it to the addresses stored in the address table TAB. The multiplexer MUX knows three virtual, logical connections LV1, LV2, LV3. From the address table TAB, it determines that the data packet should be transmitted to Berlin by way of the first logical connection LV1 and packs the data packet into a corresponding virtual container with the target Berlin. Analogous to the current nomenclature in routers, the address table is also called a routing table.

A second exemplary embodiment is shown in FIG. 6. It represents a cross-connect CC of the synchronous digital data transmission network and this cross-connect functions in accordance with the method according to the invention. At its inputs, it receives synchronous transport modules, a part of which is packed with data packets. Another part can be used, for example, for telephone conversations or other services. In the cross-connect CC, the data packets are unpacked from the payload of the transport modules and the target address of the data packets is evaluated. On the basis of the stored address table TAB and the target address, the cross-connect decides via which of the available virtual connections LV1–LV4 a respective data packet will be transmitted and packs it into the associated virtual container. In the example, the target address NAD once again reads "xyz", which stands for the target area Berlin. Accordingly, the data packet DAT is packed into the virtual container VC-2 for Berlin.

In a third exemplary embodiment shown in FIG. 7, the network element at the transfer point between a local area network and the synchronous digital data transmission network SDH is a compressor COMP1. It has an interface in accordance with the ITU recommendations for SDH to a router RTR71 of the local area network, via which it receives data packets that are packed into a virtual container VC-4. In the compressor, the data packets are unpacked from the virtual container and the target addresses of the data packets are evaluated. Filler bits or filler packets that fill a possible chronological gap between two transmitted data packets are discarded. In this case, too, a decision is made on the basis of an address table, as to which of a number of outgoing virtual containers a respective data packet should be re-packed into and therefore, which of a number of existing virtual connections is used for transmission. At least when the incoming virtual container is not fully packed, the outgoing virtual containers have a payload that is smaller in sum than these. As a result, the network load is narrowed to the actual data traffic volume. Short-term fluctuations in the incoming data traffic volume above the capacity of the outgoing container can be buffered through the use of buffer memory. When there is longer-duration overloading of the outgoing virtual connections, their capacity can be increased by means of the central network management system.

One of the virtual paths from the first compressor COMP1 ends with a second compressor COMP2, which unpacks the data packets received and packs them, together with data packets from other virtual connections, in a larger virtual container, which is transmitted to a second connected IP router RTR72.

A network element NE according to the invention is represented in a fourth exemplary embodiment in FIG. 8. It contains a selection device SEL connected to the input IN, which associates the data packets, depending on a decision made by an address monitor, with one of a number of virtual connections LV1–LV5. The interface at the input IN of the network element can be a PDH interface, an SDH interface, or also another interface that is standard for LAN routers. The target address of the incoming data packets is evaluated by the address monitor, which also has access to an address table contained in a memory MEM and, on the basis of the target addresses of received data packets and the address table, makes the decision as to which one of the available virtual connections is used to transmit a data packet. The network element NE contains a packing device PAK, which packs the data packet in accordance with the selected virtual connection into one of the virtual containers periodically transmitted by way of this connection. The output signal STM-N of the network element NE is a synchronous transport module for SDH, for example with the determined size STM-1. A number of virtual containers of different sizes can be contained and correspondingly, a number of virtual connections of different capacity can travel by way of the one output of the network element NE.

Figure 9:
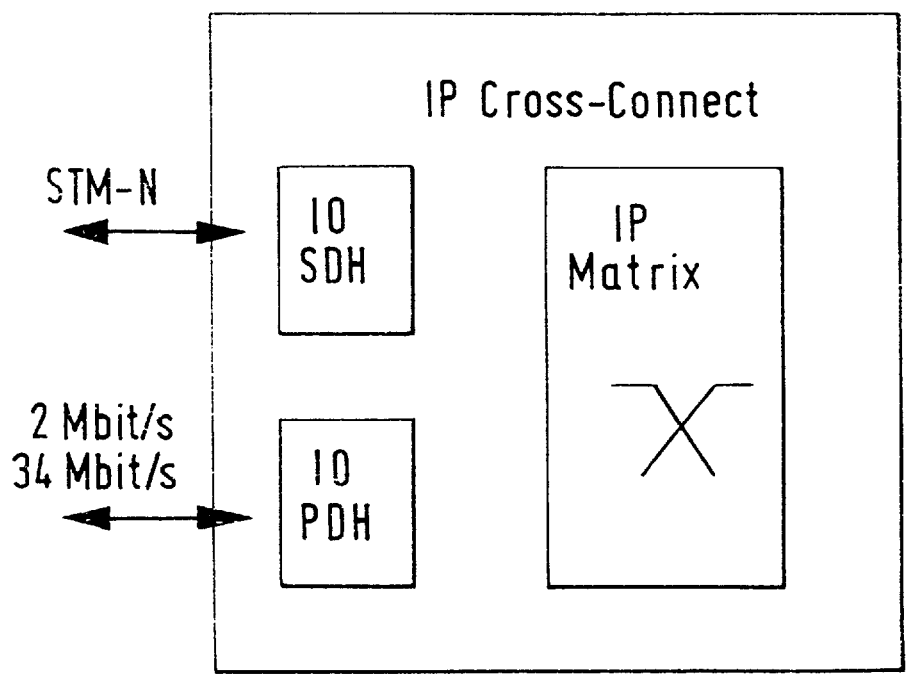
FIG. 9 shows a cross-connect according to the invention.

In FIG. 9, the functional subassemblies of a cross-connect for an SDH system are represented and this cross-connect is designed for the transmission of data packets structured in accordance with the internet protocol. It contains input/output interfaces for connections in accordance with the plesiochronous digital hierarchy (PDH) and input/output interfaces according to the synchronous digital hierarchy (SDH) as well as the conventional processing means IOPDH, IOSDH for the data signals of the two transmission systems. In addition, the cross-connect contains an IP matrix, which evaluates the target addresses of incoming data packets and connects them to corresponding virtual connections. The cross-connect can therefore be regarded as an SDH network element with an integrated IP router function.

Figure 10:
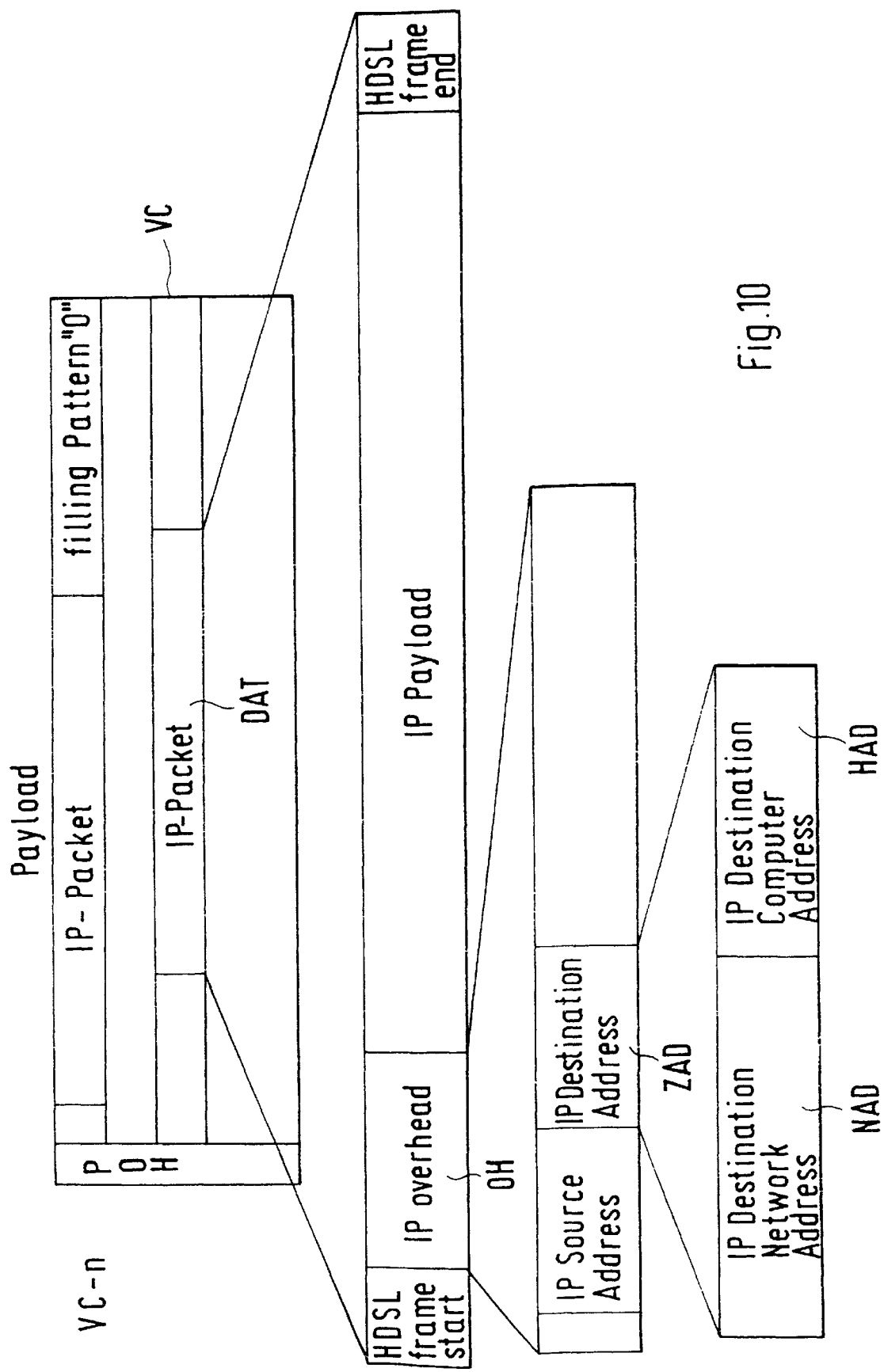
FIG. 10 shows the schematic structure of a data packet that is packed in a virtual container.

The schematic structure of a data packet, which is packed according to the invention in a virtual container VC, is shown in FIG. 10. Data packets DAT to be transmitted are packed in the payload of the virtual container. At times when there are no data packets, the payload is filled with a predetermined filler pattern, for example with zeros. In accordance with the internet protocol, the data packet DAT has a predetermined bit pattern at the beginning and end, as a beginning and ending indicator, and has an overhead OH. A source address and a target address are contained in the overhead, wherein the target address ZAD is comprised of a network address NAD and a host address HAD.

The data packets correspond to layer 3 (network layer) in the 7-layer OSI model, while the synchronous transport modules belong to the layer 1 (physical layer). The data packets can additionally be packed in a frame of the layer 2 (data link layer), for example in accordance with the standard HDLC protocol. So for example, as shown in FIG. 10, frame structures and a head part of the HDLC protocol are used as beginning and ending indicators.

It is particularly advantageous if only the network addresses are evaluated in the method according to the invention, particularly in cross-connects. This results in the execution of an automatic grouping of the incoming data packets into groups in the same target region. Only in the respective target region, for example a city or a sub-network, does the host address, which indicates the precise addressees, need to be evaluated. This permits a hierarchical structuring of wide area networks.

Figure 11:
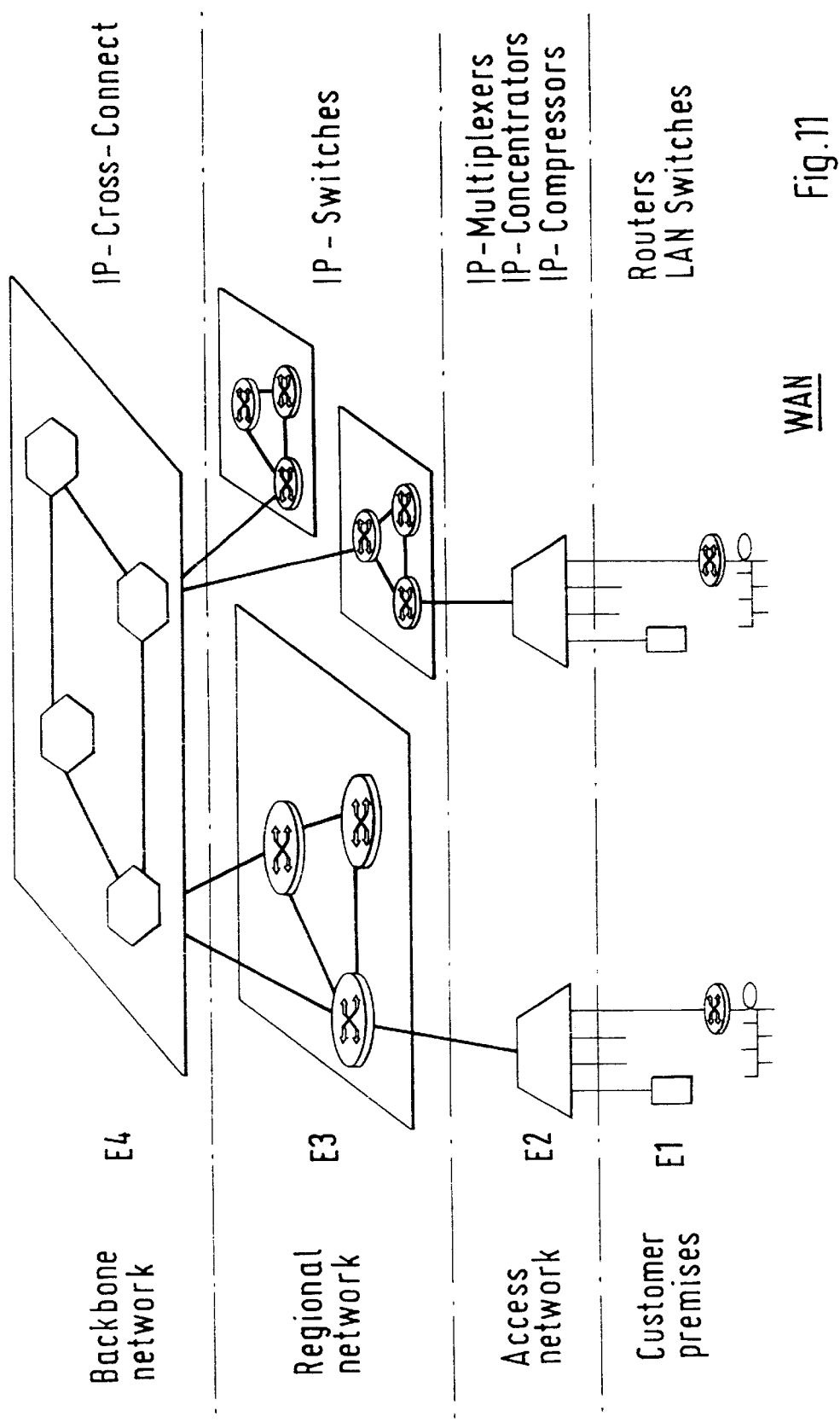
FIG. 11 shows the hierarchical structure of a wide area network (WAN), including the transmission system according to the invention.

An exemplary embodiment for such a hierarchical structuring by means of network elements according to the invention is depicted in FIG. 11. The wide area network WAN is comprised of four planes E1–E4. The first plane E1 is constituted of a large number of conventional local area networks with routers and LAN switches. The individual local area networks are connected to network elements of the second plane E2. The network elements of the second plane are multiplexers, concentrators, and/or compressors and constitute the transfer points between the local area networks and the synchronous digital data transmission network SDH disposed above them in the hierarchy.

Data packets that are addressed for local area networks, which are connected to the same network element, are returned directly to the corresponding target network of the first plane E1. All other data packets, which are group wise packed into corresponding virtual containers, are sent along to network elements of the third plane. An evaluation of the complete target addresses takes place there for a group of data packets or even for each data packet. The third plane is comprised of regional partial networks with interconnected network elements, whose function is described as an IP switch for SDH systems. Data packets that cannot be delivered into the regional partial networks are passed along to the fourth plane E4. The fourth plane E4 constitutes a backbone network that connects the regional networks of the third plane E3. The network elements of the fourth plane are cross-connects, which evaluate only a part of the target address, namely the network address of data packets to be transmitted.

From this hierarchy, it is apparent that one aspect of the invention is comprised in that only the network address is used to produce permanent virtual connections in the fourth plane E4, and that from the third plane E3, bundles of routed data packets, which bundles are specified by means of the entire target address, are transmitted in a transparent fashion by way of the permanent virtual connections of the fourth plane E4. The permanent virtual connections can be compared to a so-called pipe, by means of which the bundles, with a constant bit rate, are switched through the synchronous digital data transmission network.

An advantage of this structure is comprised in that the transit times of the data packets in the fourth plane are very low since they are not temporarily stored, but are only switched through.

Figure 12:
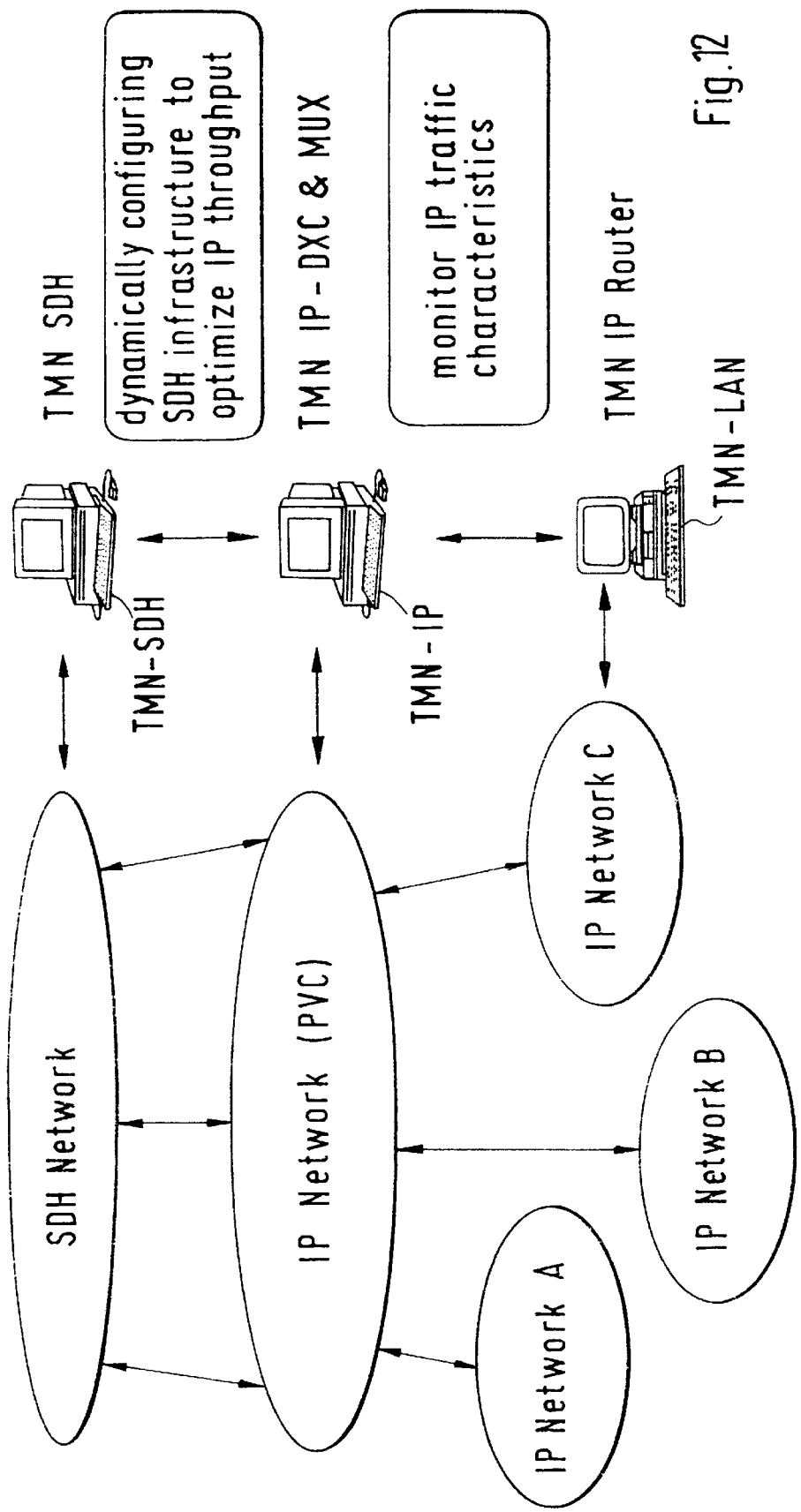
FIG. 12 shows the control of such a hierarchically structured wide area network (WAN).

An example for the structuring of a network management system for a hierarchically structured wide area network is shown in FIG. 12. The network management system is comprised of three subsystems. The first subsystem TMN-LAN is used for managing and controlling local area networks and their routers and LAN switches. The second subsystem TMN-IP manages and controls the routing functions of the network elements according to the invention, i.e. the functions responsible for the evaluation of target addresses and the making of decisions. Among other things, it is responsible for preparing and synchronizing address tables and detects the current and previous arrival of data packets in order to thus determine the need for virtual connections and transfer capacity. The third subsystem TMN-SDH executes the other control and management functions for SDH network elements. These include the establishment and changing of permanent virtual connections in the synchronous digital data transmission system and the monitoring of warnings and error alarms in the network.

The first subsystem TMN-LAN and the second subsystem TMN-IP are connected to each other in order to exchange data, e.g. for preparing address tables. The second subsystem TMN-IP and the third subsystem TMN-SDH are connected to each other in order to exchange data for the establishment of new virtual connections or the changing of the capacity of existing virtual connections. For example, the second subsystem can determine that at particular times of day or on particular days of the week, an increased data traffic volume at a particular connection takes place and it therefore indicates the third subsystem TMN-SDH at the relevant time to increase the capacity of this virtual connection. The second subsystem TMN-IP also receives messages from network elements that there is a momentary overloading of a virtual connection and as a result, requests a virtual connection with higher capacity from the third subsystem TMN-SDH. The third subsystem TMN-SDH therefore has the task of dynamically adapting the infrastructure of the synchronous digital data transmission network to the load, while the second subsystem TMN-IP has the task of monitoring the longer-term and momentary characteristics of the data traffic volume.

With the network management system, other functions can also be implemented, for example a uniform dynamic load distribution in the network, filter functions based on target addresses, data flow controls and protective functions, for example by means of the switching of redundant connections.

The described exemplary embodiments relate to SDH systems, but the invention can also be used in SONET systems and other synchronous digital data transmission systems.

Another advantageous embodiment is comprised in that a detection of so-called flows also takes place in the network elements according to the invention. Flows are sequences of data packets with the same target and source address and are produced by means of extended IP conversation between two terminals. A flow can then be handled and transmitted as a whole, i.e. all associated data packets are commonly routed through the network without individual testing of all data packets. As a result, the data throughput through the network is increased and the loading of the individual network elements is reduced. The recognition of flows is carried out by means of a conventional method.

What is claimed is:

1. A multiplexer for a synchronous digital hierarchy SDH data transmission system, comprising:
    a first interface adapted to receive data packets, each data packet being structured in accordance with the Internet Protocol IP and comprising a destination address;
    a memory in which a routing table is stored having entries regarding a plurality of virtual connections which are established by use of virtual containers VC of the SDH transmission system;
    an IP routing matrix, connected to said memory and to said first interface, for evaluating the destination address of each data packet and for making a decision, on the basis of said destination address and said routing table, as to which one of the virtual connections shall be used to transmit each data packet;
    processing means, coupled to an output of said IP routing matrix, for packing each data packet into one of said virtual containers VC which corresponds to the chosen virtual connection; and
    an SDH second interface, coupled to an output of said processing means, for transmitting said one virtual container (VC), as a subunit of a synchronous transport module STM-N, through the SDH transmission system.

2. The multiplexer according to claim 1, in which the IP routing matrix detects flows of data packets and applies a common routing to all data packets of each flow.

3. The multiplexer according to claim 1, in which the IP routing matrix is adapted to perform a filtering function, based on the destination address.

4. A method for transmitting data packets structured in accordance with the Internet Protocol IP over a synchronous digital hierarchy SDH data transmission network in which the data packets are packed into synchronous transport modules STM-N of the SDH transmission system, the method comprising the steps of:
    establishing virtual connections in the data transmission network by use of virtual containers VC of the SDH transmission system;
    storing a routing table having entries regarding said virtual connections;
    receiving the IP data packets at a first interface of a multiplexer;
    routing said IP data packets through an IP routing matrix of the multiplexer by evaluating a destination address of each data packet and by making a decision for each data packet, on the basis of its destination address and the routing table, as to which one of the virtual connections shall be used to transmit each data packet;
    packing each data packet into that one of said virtual containers which corresponds to the selected virtual connection; and
    transmitting said virtual container, at an SDH second interface of the multiplexer as a subunit of one of said synchronous transport modules STM-N through the SDH type transmission network.

5. The method according to claim 4, further comprising the steps of detecting flows of IP data packets and applying a common routing to all data packets of each flow.

6. The method according to claim 4, further comprising the step of performing a filtering function, based on the destination addresses of the IP data packets.

7. A multiplexer for a synchronous optical network SONET data transmission system, comprising:
    a first interface adapted to receive data packets, each data packet being structured in accordance with the Internet Protocol IP and comprising a destination address;
    a memory in which a routing table is stored having entries regarding a plurality of virtual connections which are established by use of virtual tributaries of the SONET transmission system;
    an IP routing matrix, connected to said memory and to said interface, for evaluating the destination address of each data packet and for making a decision, on the basis of said destination address and said routing table, as to which one of the virtual connections shall be used to transmit each data packet;
    processing means, coupled to an output of said IP routing matrix, for packing each data packet into that one of said virtual tributaries which corresponds to the chosen virtual connection; and
    a SONET second interface, coupled to an output of said processing means, for transmitting said virtual tributary as a subunit of an optical carrier OC-N through the SONET transmission system.

8. The multiplexer according to claim 7, in which the IP routing matrix detects flows of data packets and applies a common routing to all data packets of each flow.

9. The multiplexer according to claim 7, in which the IP routing matrix is adapted to perform a filtering function, based on the destination address.

10. A method for transmitting data packets structured in accordance with the Internet Protocol (IP) over a synchronous optical network (SONET) in which the data packets are packed into optical carriers OC-N of the SONET transmission system, comprising the steps of:
    establishing virtual connections in the network by use of virtual tributaries of the SONET transmission system;
    storing a routing table having entries regarding said virtual connections;
    receiving the IP data packets at a first interface of a multiplexer;
    routing said IP data packets through an IP routing matrix of the multiplexer by evaluating a destination address, forming part of each data packet, and by making a decision, for each data packet, on the basis of its destination address and the routing table, as to which one of the virtual connections shall be used to transmit each data packet;
    packing each data packet into one of said virtual tributaries which corresponds to the chosen virtual connection; and
    transmitting said virtual tributary, at a SONET type second interface of the multiplexer as a subunit of one of said optical carriers OC-N, through the SONET transmission network.

11. The method according to claim 10, further comprising the steps of detecting flows of IP data packets and applying a common routing to all data packets of each flow.

12. The method according to claim 10, further comprising the step of performing a filtering function, based on the destination addresses of the IP data packets.

* * * * *